UNITED STATES PATENT OFFICE.

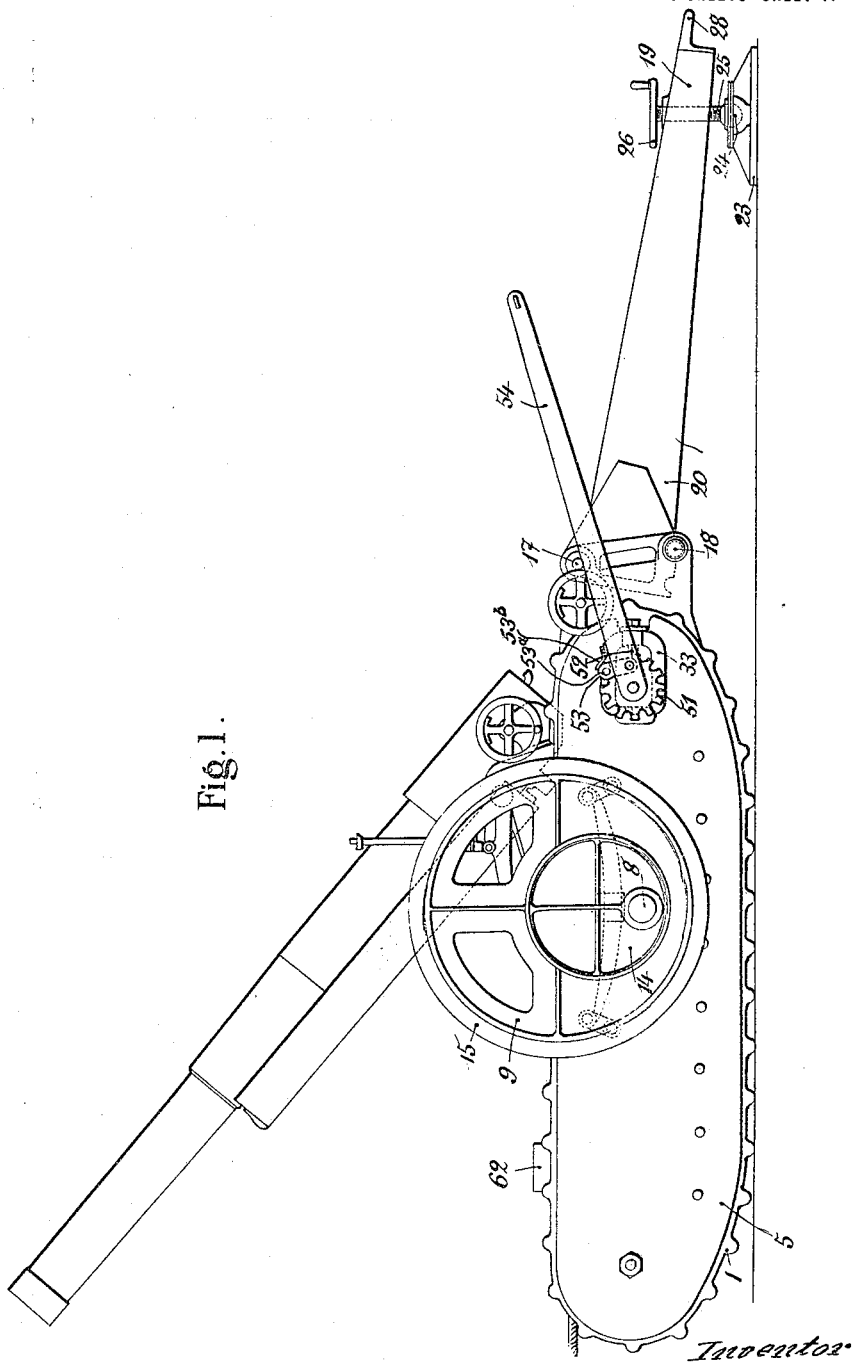

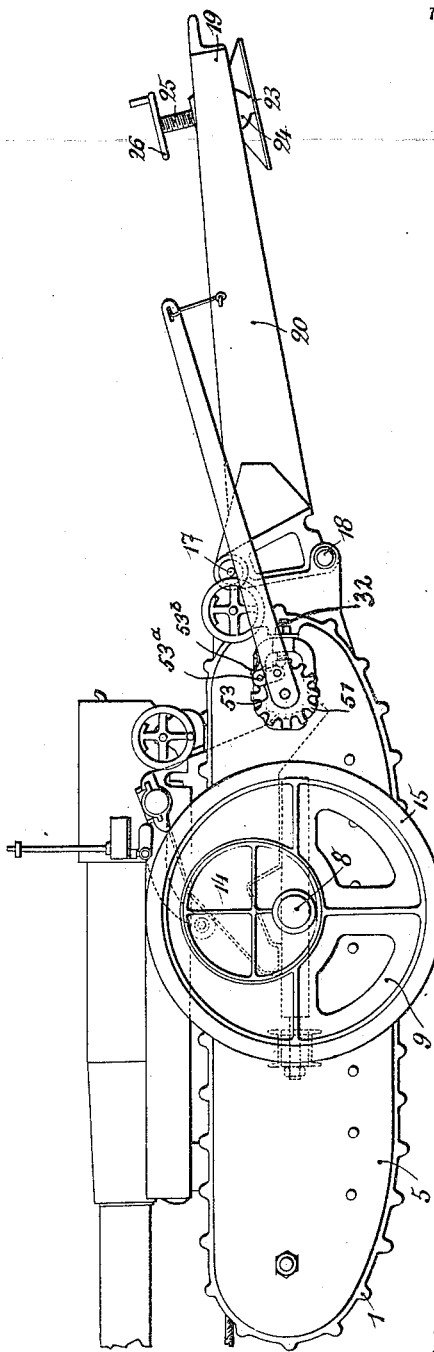

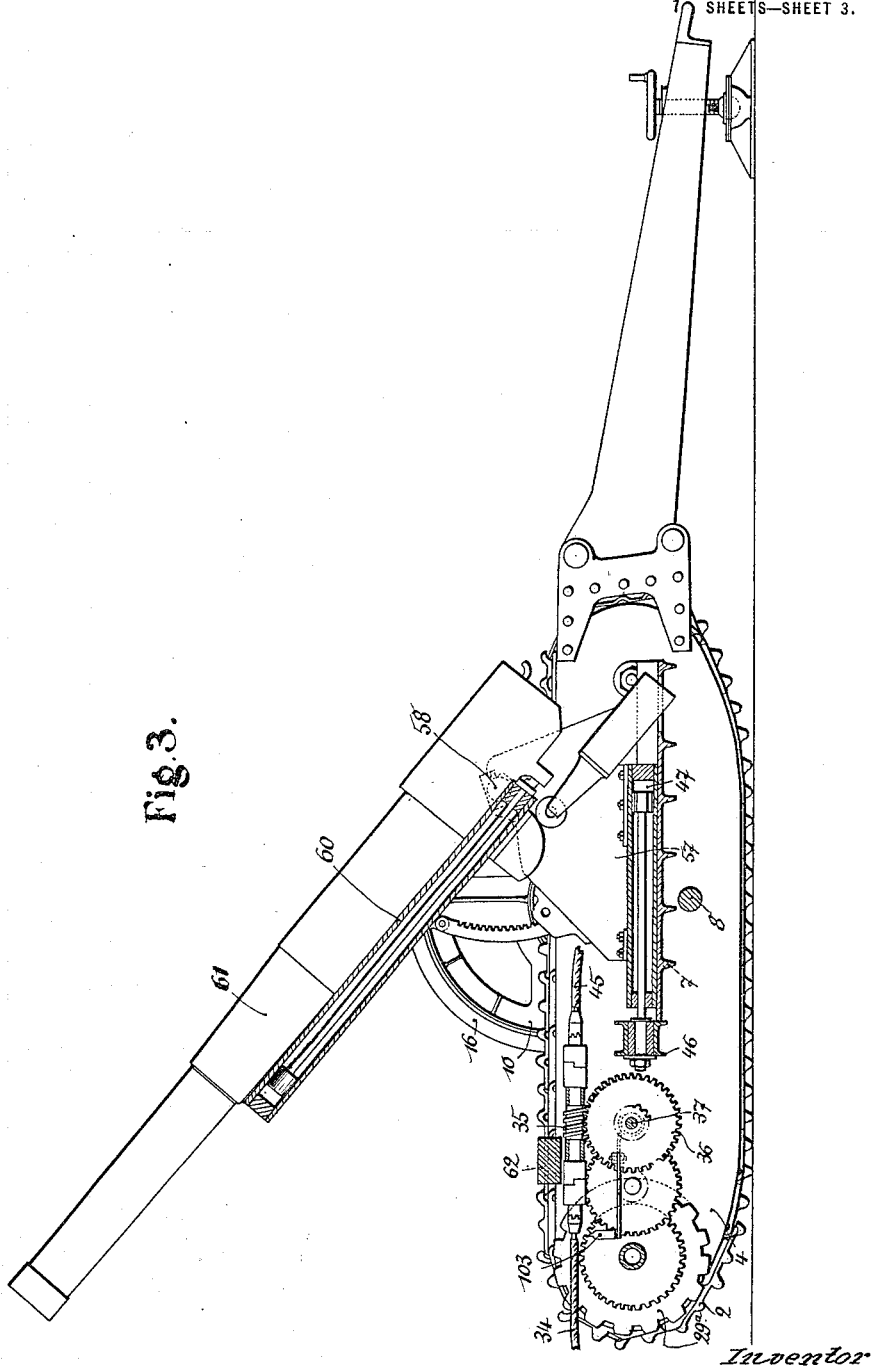

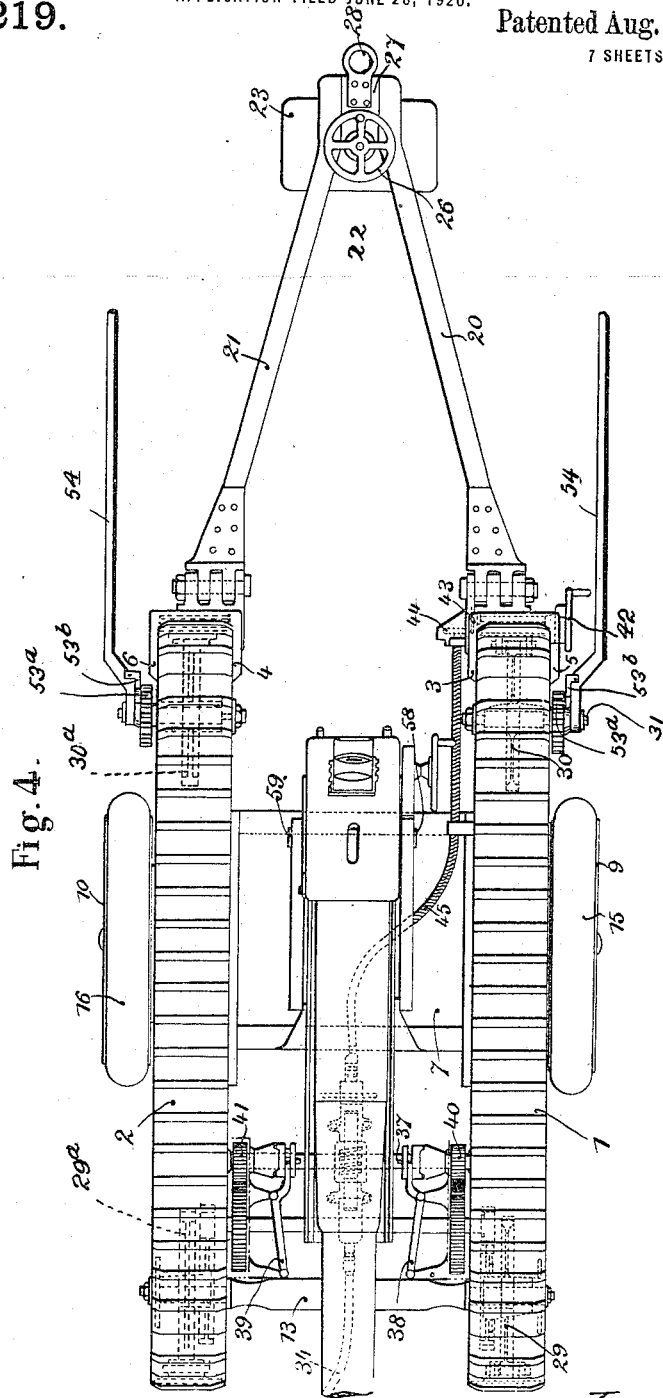

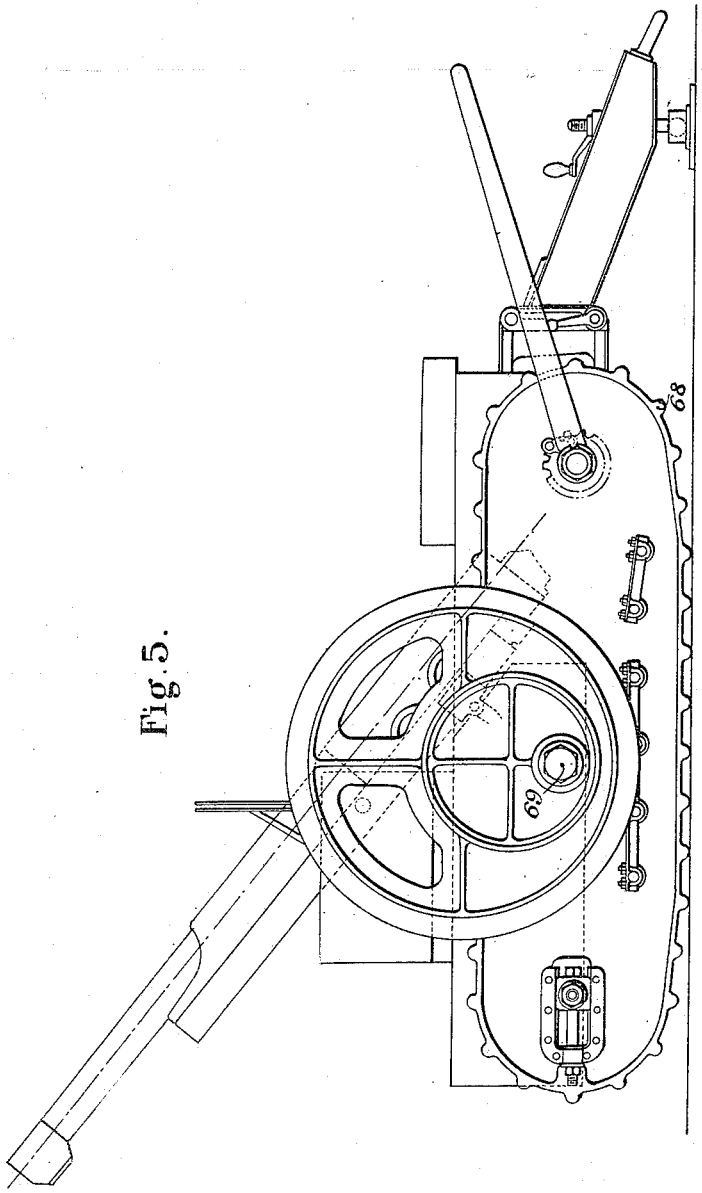

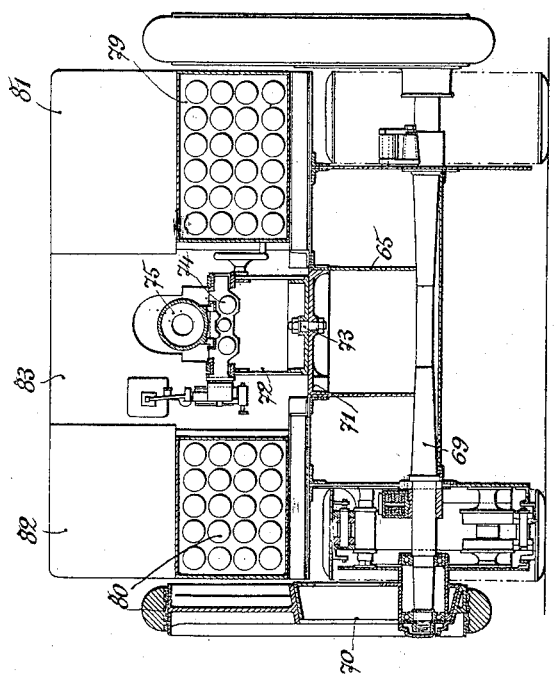

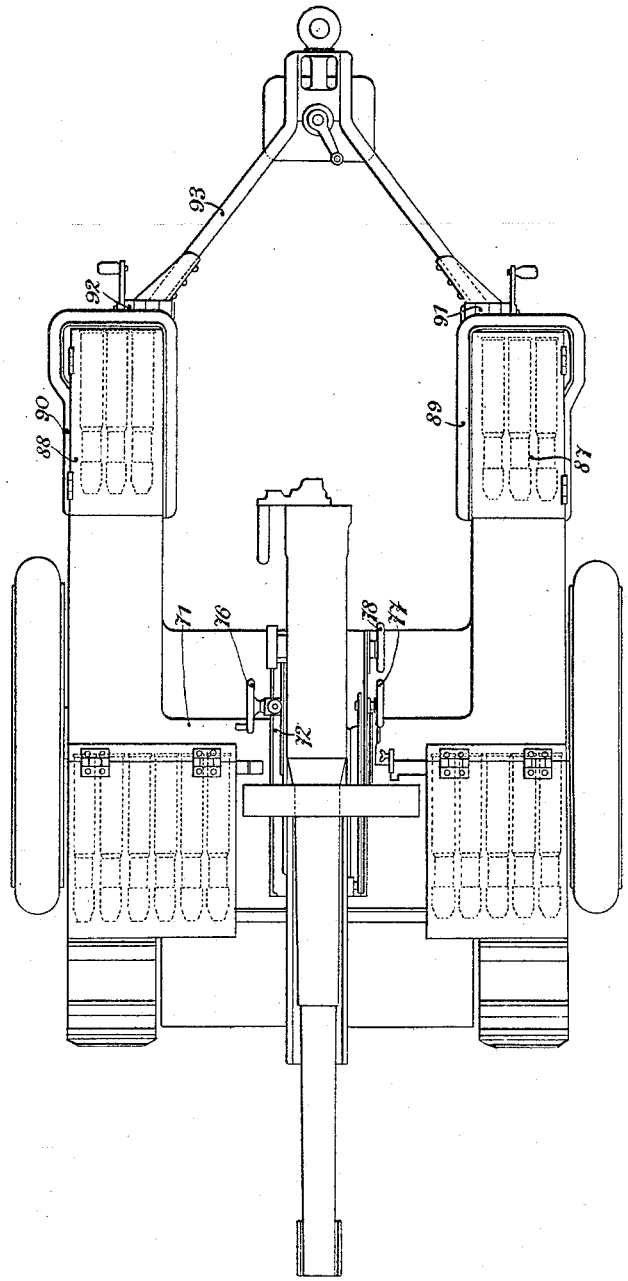

IRÉNÉ ROY, OF PARIS, FRANCE.

GUN-CARRIAGE TRAILER WITH COMBINED PROPULSION BY WHEELS AND BY ENDLESS TRACK MEMBERS.

1,426,219.  Specification of Letters Patent.  Patented Aug. 15, 1922.

Application filed June 28, 1920. Serial No. 392,307.

*To all whom it may concern:*

Be it known that I, IRÉNÉ ROY, a citizen of the Republic of France, residing at Paris, Seine Department, 12 Rue de la Rochefoucault, in the Republic of France, engineer, have invented certain new and useful Improvements in Gun-Carriage Trailers with Combined Propulsion by Wheels and by Endless-Track Members, of which the following is a specification.

This invention relates to artillery materiel having exceptionally good traveling facilities upon all kinds of ground and a perfect stability whereby a high ballistic power is obtained without prejudicial effect upon the facility for aiming in direction or upon the rapidity of the hitching operations.

The gun carriage according to the present description affords the following features:

1. Facility of movement over all kinds of ground, by reason of its double method of propulsion and its distant control by flexible shaft.

2. High power with reference to the weight of the artillery materiel, due to the considerable increase in wheel base which is obtained by the use of a trail member pivoted to the rear portion of the frame and susceptible of rigid connection with the latter when in the lower position by means of a suitable locking device, this increased wheel base affording stability in the vertical sense, while the stability in the horizontal sense is provided for by the adherence of the endless tracks and the mechanism of the brakes.

3. Facility of aiming in direction is obtained by means of an aiming hand wheel adapted to actuate the endless track members by means of worm gearing, whereby the aiming can be carried out upon any object around the horizon.

4. Speed in hitching operations is secured by the arrangement of the trail member, which bears upon the ground only through a non-anchored base plate.

The accompanying drawings show by way of example a practical embodiment of the invention.

Fig. 1 is an elevation, in the firing position, of a gun carriage trailer with combination propulsion.

Fig. 2 is a view of the same carriage in the road position.

Fig. 3 is a vertical section of this carriage.

Fig. 4 is a plan view of the same.

Fig. 5 is an elevation of a gun carriage trailer of the same type for lighter artillery materiel.

Fig. 6 is a sectional transverse view of the same.

Fig. 7 is a plan view.

In Figs. 1, 2, 3 and 4, 1 and 2 are the endless track members supported by main girders 3 and 4; and outer girders 5, 6; a transverse plate 7 constitutes the supporting frame for the endless track girders; these girders are traversed by an axle 8 carrying thereon the wheels 9 and 10 with eccentrically mounted hubs 14. The eccentric hubs can be placed upon the axle in the two positions shown in Figs. 1 and 2 and securely held in the desired position. In the position shown in Fig. 2, the wheels are to rotate about the axis of the axle 8, and therefore the axle may be secured to the hub and may rotate in the beams 3 and 4, or on the contrary, the hub 14 may rotate about the axle, as may be desired. In all cases, the wheel is secured to the hub 14 by any suitable means in order to rotate with the latter. The proper spacing of the endless track girders is obtained by means of an axle 13 whose ends serve as journals for the pulleys.

In Fig. 1 the carriage rests upon the endless track members, and the wheels with eccentric hubs such as 14 have their rubber covered fellies 15, 16 in the raised position. The main girders are somewhat extended to the rear in order to carry the articulation 17 and the locking bolt 18 for securing the trail member 19 in fixed position, the cheeks 20, 21 of the latter being open as far as the point 22 in order to provide for the recoil of the gun. The end of the trail is provided with a spade plate 23 mounted by means of the bearing 24 upon a screw 25 which forms part of the hand wheel member 26; this screw which constitutes a jack is mounted on the trail carrier 27. The end of the trail member carries the coupling or hitching ring 28. The trail member can be locked in position upon the main girders 3, 4 for the two positions of firing and coupling, either by means of bolts or preferably by the use of semi-cylindrical pieces carried by the girders and actuated by means of cranks.

The member 18 comprises the cylindrical portions journaled in the main beams 3 and 4, and semi-cylindrical portions situated opposite recesses formed in the end of the trail. When the rotation of the member 18 causes the semi-cylindrical portions to assume the upper position, the fastening is carried out, and on the contrary, when the semi-cylindrical portions are in the lower position, the trail may be pivoted about the axle 17″.

The endless tracks here employed are of the current type, and are disposed about the roller pulleys 29, 29$^a$ and 30, 30$^a$ one of which, such as 29, being mounted upon a stationary journal, while the second, 30, rotates upon a journal member 31 slidable by means of a stretcher 32 upon the guideways 33.

The movements of the gun carriage trailer can be facilitated and its aiming capacities extended by the use of a distant control device for operating the endless tracks.

A flexible shaft 34 (Figs. 3 and 4) serves to convey the power supplied from an outside source, for instance from the tractor of the gun carriage trailer, or from a truck employed for the traction of the said carriage. This shaft is connected by means of the worm 35 and worm gear 36 to a cross-shaft 37 which can be coupled by means of the clutches 38 and 39 to the pinions 40, 41 which drive the pulleys 29, 29$^a$ through reduction gearing, whereby one or both of the said pulleys can be actuated as desired. In this manner, when passing over particularly difficult spot or amid obstacles, the critical point can be cleared by the gun carriage trailer independently of its tractor, since this power gear affords the means for traveling straight forward or for steering in all directions. Moreover, for the minor displacements, the endless tracks can be actuated by hand by means of the following mechanism.

A hand wheel 42 actuates, by means of the bevel gears 43, 44, a flexible shaft 45 connected by worm gear in the same way as the shaft 34 to the cross-shaft 37 carrying the pulleys 29 and 29$^a$. It is preferable that the shaft having secured thereto the pinion 43 and the hand-wheel 42 may slide lengthwise in its bearing and may be pushed by a spring disposed between the beam 5 and the hand-wheel 42 in such manner as to maintain the pinion 43 constantly disengaged from the pinion 44. In this manner, the hand-wheel 42 will remain motionless when the trail is moved by means of the shaft 34. To use this hand-wheel it is pushed against the pinion 44 in such manner to engage the members.

The endless track rollers or pulleys 30, 30$^a$ can moreover be provided outside the girders with circular disks 51, 52 containing holes or stops and constituting a driving ratchet actuated by the hooks 53 of the operating levers 54. These hooks are pivoted to the levers 54 and are provided with the projections 53$^a$ which engage the teeth of the disks 51, 52. Preferably, the springs 53$^b$ maintain the projections 53$^a$ in the teeth of the disks 51, 52 so that while making a downward effort upon the levers 54, these projections cannot leave the said teeth, but on the contrary they will rise when the disks are caused to rotate by the travel of the vehicle. These levers can be operated at a considerable angle of range by one or several men.

The frame 7 of the carriage is provided at the forward end with a cross member 46 to which is secured the gun carriage brake 47, whereby the gun can recoil upon the guideways disposed at each side of the frame.

In Fig. 3 the cannon proper comprises a small base 57 having mounted at the lower part thereof the carriage brake 47 and at the upper part the journals 58; 59 of the gun brake 60 supporting the cannon 61. This small truck 57 is adapted to slide upon the guideways disposed at each side of the frame 7. When traveling on the road (Fig. 2) the swinging portion comprising the brake and the cannon rests by its front part upon a cross-piece 62 forming part of the trailer frame 7.

In Figs. 5, 6 and 7 which show the carriage trailer mounted upon endless tracks of a lighter type than the preceding, the practical conditions of the gun service have given rise to a somewhat different construction from the one which has been herein described. In these figures, 65 is the carriage trailer frame, 68 the outline of the endless track, 69 the spring mounted axle supporting the gun carriage when the latter travels upon the eccentric hub wheels shown diagrammatically at 70; 71 represents the supporting frame of the small carriage 72 having a pivotal movement on the pintle 73 and supporting the assemblage of brake and cannon 74, 75 and also the devices employed in aiming for elevation provided with the hand wheels 76, 77 for vertical and lateral movements; the hand wheel 78 is also disposed for the lateral aiming movement of the small carriage 72, this affording an advantage in the shape of a precise means for rectifying the lateral aiming independently of the maneuver of the gun carriage trailer itself. The frame 65 of the said trailer is provided on the right and left hand sides with the ammunition chests 79, 80, whose covers 81, 82 when raised will serve to complete the fixed shield 83, thus assuring the complete protection of the gunners. The small chests 87, 88 provide for an extra supply of ammunition within reach of the loading gunner during the firing. The main girders of the frame, 89. 90 are extended to the rear in order to support the articulations 91, 92 of the trail member 93 as in the preceding case. This trail member can be locked fast when on the road or can be used as a drag-bar to connect the gun carriage to a tractor. It will be observed that this trail member is much shorter than in the preceding type, since the capacity of the apparatus does not require the same longitudinal spread.

Claims:

1. An artillery truck comprising a frame, two endless tracks and two road wheels adapted to be put in use alternately, and in the rear portion of the said frame a pivoted trail adapted for rigid connection with the said frame in different positions and a plate pivoted to the movable end of the said trail and adapted to be placed flat upon the ground.

2. An artillery truck comprising a frame, two endless tracks and two road wheels adapted to be put in use alternately, a trail pivoted to the rear portion of the said frame, a nut secured to the said trail, a screw engaging the said nut and having the end thereof in the form of a socket bearing, and a plate pivoted to this end of the screw and adapted to be placed upon the ground.

3. An artillery truck comprising a frame, two endless tracks and two road wheels adapted to be put in use alternately, and in the rear portion of the said frame a pivoted trail adapted for rigid connection with the said frame in different positions, a plate pivoted to the end of the said trail and adapted to be placed flat upon the ground, and a mechanism for actuating the endless tracks comprising a flexible shaft extending outwardly of the said frame and speed-reduction gearing whereby the said shaft is caused to drive the said endless tracks.

4. An artillery truck comprising a frame, two endless tracks and two road wheels adapted to be put in use alternately, and in the rear portion of the said frame a pivoted trail adapted for rigid connection with the said frame in different positions, a plate pivoted to the end of the said trail and adapted to be placed flat upon the ground, and a mechanism for actuating the endless tracks comprising a flexible shaft extending outwardly of the said frame and speed-reduction gearing whereby the said shaft is caused to drive the said endless tracks, the driving devices between the said flexible shaft and each of the endless tracks comprising a separate clutch coupling device.

5. An artillery truck comprising a frame, two endless tracks and two road wheels adapted to be put in use alternately, and in the rear portion of the said frame a pivoted trail adapted for rigid connection with the said frame in different positions, a plate placed flat upon the ground, and a hand-operated mechanism for actuating the said endless tracks comprising a hand lever, a hook pivoted to the said lever and a notched wheel adapted to actuate each of the endless tracks, the said lever being pivoted to the axle of the said wheel and the respective hook engaging the notches of the said wheel.

6. An artillery truck comprising a frame, two endless tracks and two road wheels adapted to be put in use alternately, and in the rear portion of the said frame a pivoted trail adapted for rigid connection with the said frame in different positions, a plate pivoted to the end of the said trail and adapted to be placed flat upon the ground, and a mechanism for actuating the said endless tracks comprising a flexible shaft extending outwardly of the said frame and speed-reduction gearing whereby the said shaft is caused to drive the said endless tracks the driving device between the said flexible shaft and each of the endless tracks comprising a separate clutch coupling device, a second flexible shaft, hand-operating means disposed upon the truck frame for actuating this second flexible shaft, the said reduction gearing being disposed in such manner as to be disengaged from the first mentioned flexible shaft and to engage the second flexible shaft.

In testimony that I claim the foregoing as my invention I have signed my name in presence of a subscribing witness.

IRÉNÉ ROY.

Witness:
MAUD COMPIN.